United States Patent
Lewis et al.

(10) Patent No.: US 10,183,372 B2
(45) Date of Patent: Jan. 22, 2019

(54) THREAD REPAIR TOOLS AND METHODS OF MAKING AND USING THE SAME

(71) Applicants: Terry A. Lewis, Valdosta, GA (US); Travis R. Lewis, Valdosta, GA (US); David M. Lewis, Valdosta, GA (US)

(72) Inventors: Terry A. Lewis, Valdosta, GA (US); Travis R. Lewis, Valdosta, GA (US); David M. Lewis, Valdosta, GA (US)

( * ) Notice: Subject to any disclaimer, the term of this patent is extended or adjusted under 35 U.S.C. 154(b) by 129 days.

(21) Appl. No.: 15/216,923

(22) Filed: Jul. 22, 2016

(65) Prior Publication Data

US 2017/0066100 A1   Mar. 9, 2017

Related U.S. Application Data

(60) Provisional application No. 62/305,633, filed on Mar. 9, 2016, provisional application No. 62/196,552, filed on Jul. 24, 2015.

(51) Int. Cl.
*B24B 23/02* (2006.01)
*B24B 19/02* (2006.01)
(Continued)

(52) U.S. Cl.
CPC ............... *B24B 19/022* (2013.01); *B23G 5/00* (2013.01); *B23G 9/00* (2013.01); *B23G 9/009* (2013.01);
(Continued)

(58) Field of Classification Search
CPC ......... B23G 9/009; B24B 3/021; B24B 3/045; B24B 19/022; B24B 23/02; B24B 53/065; B24B 53/07; B24B 53/075
See application file for complete search history.

(56) References Cited

U.S. PATENT DOCUMENTS

| 1,355,710 A | * | 10/1920 | Stryhal | ................. B24B 19/022 |
| | | | | 125/11.15 |
| 1,528,188 A | * | 3/1925 | Frost | .................... B24B 19/022 |
| | | | | 125/11.15 |

(Continued)

FOREIGN PATENT DOCUMENTS

| DE | 122968 | 8/1901 |
| FR | 2413182 | 7/1979 |
| GB | 2192574 | 1/1988 |

*Primary Examiner* — Timothy V Eley
(74) *Attorney, Agent, or Firm* — Withers & Keys, LLC (57) ABSTRACT

Thread repair tools having (i) a disc-shaped member with an axis of rotation extending through and dissecting first and second major surfaces of the disc-shaped member, (ii) a shaft fixedly connected to or fixedly connectable to the disc-shaped member, with the shaft extending from the second major surface of the disc-shaped member along the axis of rotation; and (iii) an abrasive surface along an outer periphery of the disc-shaped member are disclosed. Methods of making the thread repair tools, and methods of using the thread repair tools are also disclosed. Methods of using the thread repair tools include a method of: (i) connecting the thread repair tool to a hand-held powered device capable of rotating the thread repair tool along the axis of rotation of the thread repair tool, and (ii) abrading an object with the disc-shaped member of the thread repair tool as the thread repair tool is rotated along the axis of rotation by the hand-held powered device.

24 Claims, 8 Drawing Sheets

(51) Int. Cl.
*B23G 9/00* (2006.01)
*B23G 5/00* (2006.01)
*B23P 6/00* (2006.01)
*B24D 5/06* (2006.01)

(52) U.S. Cl.
CPC .............. *B23P 6/00* (2013.01); *B24B 23/02* (2013.01); *B24D 5/06* (2013.01)

(56) References Cited

U.S. PATENT DOCUMENTS

| | | | | |
|---|---|---|---|---|
| 1,573,523 A * | 2/1926 | Richard, Jr. | ......... | B24B 19/022 451/222 |
| 1,640,991 A * | 8/1927 | Hanson | ................ | B24B 19/022 451/547 |
| 1,660,468 A * | 2/1928 | Bath | ................... | B24B 19/022 125/11.15 |
| 1,702,160 A * | 2/1929 | Hanson | ................ | B24B 19/022 451/222 |
| 1,722,023 A * | 7/1929 | Streby | ................ | B24B 19/022 451/143 |
| 1,798,832 A * | 3/1931 | Buckingham | ......... | B24B 19/022 451/144 |
| 1,807,516 A * | 5/1931 | Durkee | ................ | B24B 19/022 451/222 |
| 1,818,288 A * | 8/1931 | Walker | ................ | B24B 19/022 451/129 |
| 1,871,674 A * | 8/1932 | Ellithorpe | ............. | B24B 23/02 451/358 |
| 1,965,035 A * | 7/1934 | Godziewski | .......... | B24B 19/022 409/66 |
| 1,979,325 A * | 11/1934 | Goldberg | ................ | B24B 41/04 132/73.6 |
| 1,983,286 A * | 12/1934 | Godziewski | .......... | B24B 19/022 451/222 |
| 1,991,764 A * | 2/1935 | Lovgren | ............... | B24B 23/026 415/151 |
| 1,995,421 A * | 3/1935 | Goldberg | ................ | F16C 1/06 403/229 |
| 2,060,044 A * | 11/1936 | Crowey | ................ | B24B 19/022 451/20 |
| 2,098,145 A * | 11/1937 | Harley | ................. | B24B 19/022 451/222 |
| 2,112,491 A * | 3/1938 | Hintz | ................... | B24B 19/022 33/542 |
| 2,125,584 A * | 8/1938 | Rotzoll | ................ | B24B 19/022 451/222 |
| 2,131,939 A * | 10/1938 | Drake | ................... | B24B 19/022 451/222 |
| 2,138,739 A * | 11/1938 | Harley | ................. | B24B 19/022 451/221 |
| 2,169,159 A * | 8/1939 | Moller | ................. | B24B 19/022 409/79 |
| 2,301,058 A * | 11/1942 | Lehman | ............... | B24B 19/022 451/143 |
| 2,352,888 A * | 7/1944 | Dettloff | ................ | B23Q 1/70 101/22 |
| 2,354,307 A * | 7/1944 | Emery | .................. | B24B 23/02 451/358 |
| 2,375,703 A * | 5/1945 | Swartzwelder | ........... | B24B 3/60 451/121 |
| 2,380,286 A * | 7/1945 | Bauer | .................. | B24B 19/022 125/11.15 |
| 2,380,883 A * | 7/1945 | Turrettini | ............. | B24B 19/022 451/222 |
| 2,390,226 A * | 12/1945 | Smith | ................. | B43L 19/0006 15/23 |
| 2,414,896 A * | 1/1947 | Richter | ................ | B24B 19/022 33/199 B |
| 2,420,504 A * | 5/1947 | Stewart | ................ | B24B 19/022 125/11.16 |
| 2,423,422 A * | 7/1947 | Turrettini | ............. | B24B 19/022 125/11.16 |
| 2,469,077 A * | 5/1949 | Rickenmann | ......... | B24B 19/022 409/69 |
| 2,495,107 A * | 1/1950 | Koenig | ................. | B24B 19/022 409/68 |
| 2,513,694 A * | 7/1950 | Turrettini | .............. | B24B 19/022 451/222 |
| 2,524,541 A * | 10/1950 | Praeg | .................... | B24B 19/022 451/220 |
| 2,724,223 A * | 11/1955 | Fennell | ................. | B24B 19/022 451/394 |
| 2,822,600 A * | 2/1958 | Scott | ..................... | B24B 19/022 264/151 |
| 2,829,471 A * | 4/1958 | Peickii | .................. | B24B 19/022 451/222 |
| 2,947,616 A * | 8/1960 | Loring, Jr. | ............... | B23H 5/08 427/122 |
| 2,981,038 A * | 4/1961 | Flanders | ................ | B24B 19/022 125/11.04 |
| 3,064,396 A * | 11/1962 | Loring, Jr. | .............. | B23Q 15/00 451/14 |
| 3,089,286 A * | 5/1963 | Ulrich | ..................... | B24B 3/365 451/124 |
| 3,093,464 A * | 6/1963 | Loring, Jr. | ................ | B24B 1/00 51/295 |
| 3,251,086 A * | 5/1966 | Springer | ................... | A47L 23/06 15/258 |
| 3,339,537 A * | 9/1967 | Stade | .................... | B24B 53/075 125/11.07 |
| 3,461,613 A * | 8/1969 | Schnepp | ................ | B24B 19/022 451/143 |
| 3,486,275 A * | 12/1969 | Chitayat | ................ | B24B 19/022 451/5 |
| 3,488,886 A * | 1/1970 | Braum | ..................... | B24B 3/245 451/247 |
| 3,538,647 A * | 11/1970 | Bronislaw | ............. | B24B 19/022 409/76 |
| 3,561,171 A * | 2/1971 | Van Vleet et al. | ...... | B23G 7/02 451/48 |
| 3,597,883 A * | 8/1971 | Choplin | ..................... | B24B 23/02 451/358 |
| 3,728,823 A * | 4/1973 | Tomita | ..................... | B23G 1/38 409/76 |
| 3,812,626 A * | 5/1974 | Thompson | ............... | B24B 3/003 451/241 |
| 3,935,909 A * | 2/1976 | Mabuchi | ................ | B23B 45/02 15/23 |
| 4,143,637 A * | 3/1979 | Mesey | ................... | B24B 53/075 125/11.03 |
| 4,175,537 A * | 11/1979 | Wiener | ................ | B23F 23/1225 125/11.03 |
| 4,226,053 A * | 10/1980 | Inoue | ..................... | B24B 27/00 451/11 |
| 4,615,144 A * | 10/1986 | Peacock | .................. | B24B 3/003 451/349 |
| 4,827,675 A * | 5/1989 | Andrews | ................ | B24B 19/02 415/139 |
| 4,860,501 A * | 8/1989 | Belthle | ..................... | B23G 1/36 451/48 |
| 4,993,194 A * | 2/1991 | Cadisch | ................... | B24B 53/075 451/253 |
| 5,190,620 A * | 3/1993 | Winter | ................... | B24D 13/12 156/154 |
| 5,210,980 A * | 5/1993 | Phillips | ..................... | B23G 1/38 451/11 |
| 5,235,716 A * | 8/1993 | Stella | ........................ | A46B 7/04 15/23 |
| 5,259,914 A * | 11/1993 | Fisher | .................... | B24B 23/02 156/714 |
| 5,332,098 A * | 7/1994 | Fisher | .................... | B24B 23/02 206/374 |
| 5,564,969 A * | 10/1996 | Tsang | ..................... | B24B 23/02 451/344 |
| 5,586,469 A * | 12/1996 | Mitani | ................... | B24B 19/022 74/424.86 |
| 5,732,728 A * | 3/1998 | Maichel | .................. | F16L 55/105 137/15.14 |

(56) References Cited

U.S. PATENT DOCUMENTS

| | | | | |
|---|---|---|---|---|
| 5,775,981 A * | 7/1998 | Yang | B24B 45/006 | 279/905 |
| 5,941,764 A * | 8/1999 | Yang | B23B 31/1071 | 279/75 |
| 6,077,150 A * | 6/2000 | Jankowski | B24B 53/075 | 451/147 |
| 6,136,143 A * | 10/2000 | Winter | B24D 5/16 | 15/3.53 |
| 6,264,408 B1 * | 7/2001 | Lung | B23B 49/008 | 279/157 |
| 6,290,574 B1 * | 9/2001 | Thyssen | B23F 23/1225 | 451/10 |
| 6,332,836 B1 * | 12/2001 | Tseng | B24B 23/022 | 451/359 |
| 6,343,901 B2 * | 2/2002 | Wheeler | B23B 31/1207 | 279/30 |
| 6,361,412 B1 * | 3/2002 | Kaiser | B24B 53/062 | 125/11.03 |
| 6,561,063 B1 * | 5/2003 | Mulford | B24B 55/052 | 30/390 |
| 6,848,451 B2 * | 2/2005 | Postal | A61C 1/07 | 132/75.8 |
| 6,976,909 B1 * | 12/2005 | Hoover | B24B 23/02 | 451/354 |
| 6,984,169 B2 * | 1/2006 | Chen | B24B 23/026 | 451/340 |
| 7,581,545 B1 * | 9/2009 | Moldawski | A45D 40/22 | 132/73.6 |
| 7,927,189 B2 * | 4/2011 | Grady | B24D 7/00 | 279/8 |
| 8,267,748 B2 * | 9/2012 | Lee | B24B 23/00 | 451/344 |
| 8,512,098 B1 * | 8/2013 | Bonner | B24B 19/022 | 451/28 |
| 2002/0094769 A1 * | 7/2002 | Lai | B24B 23/02 | 451/358 |
| 2002/0177389 A1 * | 11/2002 | Cutsforth | B24B 1/00 | 451/29 |
| 2004/0185761 A1 * | 9/2004 | Mota | B24D 5/16 | 451/342 |
| 2008/0233845 A1 * | 9/2008 | Annen | B24B 23/04 | 451/259 |
| 2011/0312253 A1 * | 12/2011 | Shimizu | B23C 5/10 | 451/45 |
| 2013/0237133 A1 * | 9/2013 | Chen | B24B 19/022 | 451/159 |
| 2013/0309944 A1 * | 11/2013 | Verbinnen | B23F 15/08 | 451/47 |
| 2016/0023328 A1 * | 1/2016 | Flaschberger | B24B 53/07 | 51/309 |
| 2017/0066100 A1 * | 3/2017 | Lewis | B23G 5/00 | |

* cited by examiner

THREAD REPAIR TOOLS AND METHODS OF MAKING AND USING THE SAME

CROSS-REFERENCE TO RELATED APPLICATIONS

This patent application claims the benefit of priority to (i) U.S. Provisional Patent Application Ser. No. 62/196,552 filed on Jul. 24, 2015 and entitled "THREAD REPAIR TOOLS AND METHODS OF MAKING AND USING THE SAME" and (ii) U.S. Provisional Patent Application Ser. No. 62/305,633 filed on Mar. 9, 2016 and entitled "THREAD REPAIR TOOLS AND METHODS OF MAKING AND USING THE SAME," the subject matter of both of which is hereby incorporated by reference in its entirety.

FIELD OF THE INVENTION

The present invention relates to thread repair tools. The present invention also relates to methods of making thread repair tools and methods of using thread repair tools.

BACKGROUND OF THE INVENTION

Damaged threads (e.g., on a screw, bolt or other mechanical object) are a common occurrence when dealing with any threads in the field of home repair, automotive repair, farm repair, industrial repair, or the like. There are many reasons for damaged threads, some of which are wear, abuse, mechanical failure of other parts in an assembled system, or just plain negligence. For whatever reason, the threads must be reshaped in order to continue using (or reuse) or must be discarded and replaced. This problem can occur on male or female thread profiles. Common problems that may occur with threads (or any profile which requires a mating section to engage with such as a thread does) include, but are not limited to, cross threading, nicks, flatten crest profile, gashes, and stripped threads.

U.S. Pat. No. 1,694,229, issued to Joseph P. Nestor, discloses a linear approach to restoring threads, which requires an array of mating thread pitches and profile angles thus requiring each tooth on the face of the disclosed cutting file device to match that of the various thread pitches in the industry. Although effective, the device is not efficient and is cumbersome. The device's saw-like cutting action is hand-driven, making it difficult to work on, for example, cylindrical objects (e.g., screws and bolts). The device requires more labor, more time, more tool inventory, and thus resulting in more expense.

European Patent Application No. EP19880309663 discloses a tool that utilizes abrading discs 38/38' rotatably mounted on stationary (i.e., non-rotating) shafts 40/41', which are both connected to arms 24/24'.

Efforts continue to provide innovative and useful thread repair tools.

SUMMARY OF THE INVENTION

The present invention provides new thread repair tools. The thread repair tools of the present invention provide one or more of the following benefits: (1) ease to produce; (2) ease of use; (3) exceptional design; and (4) efficient use in repairs.

The thread repair tool of the present invention is not limited to thread pitch, and can be used on all metric, unified (e.g., inch), and pipe threads in the market, requiring only one tool to complete an array of applications on internal and/or external threads. By changing the disc-shaped member profile to match that of the damaged flute profile, the thread repair tool of the present invention can be customized to cut and form an endless number of features. The thread repair tool of the present invention is self-driven with an air grinder or the like, which minimizes labor. Work is reduced to holding the grinder (or drill) into the profile and making circular sweeps around the perimeter of the area being restored. This requires only holding the tool, with no pressure required.

Accordingly, in one exemplary embodiment, the present invention is directed to thread repair tools. In some exemplary embodiments of the present invention, the thread repair tool comprises: a disc-shaped member having a first major surface, a second major surface opposite the first major surface, an outer periphery separating the first major surface from the second major surface, and an axis of rotation extending through and dissecting each of the first and second major surfaces; a shaft extending from the second major surface of the disc-shaped member along the axis of rotation; and an abrasive coating along the outer periphery, the abrasive coating comprising an inorganic and/or organic abrasive capable of abrading a metal object.

Figure 1:
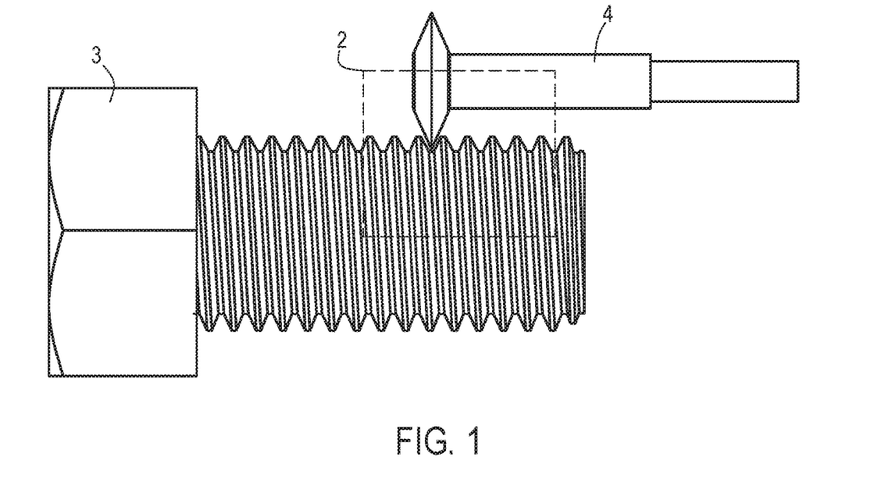
FIG. 1 depicts an exemplary tool of the present invention and its use in repairing threads of a bolt.
Figure 3:
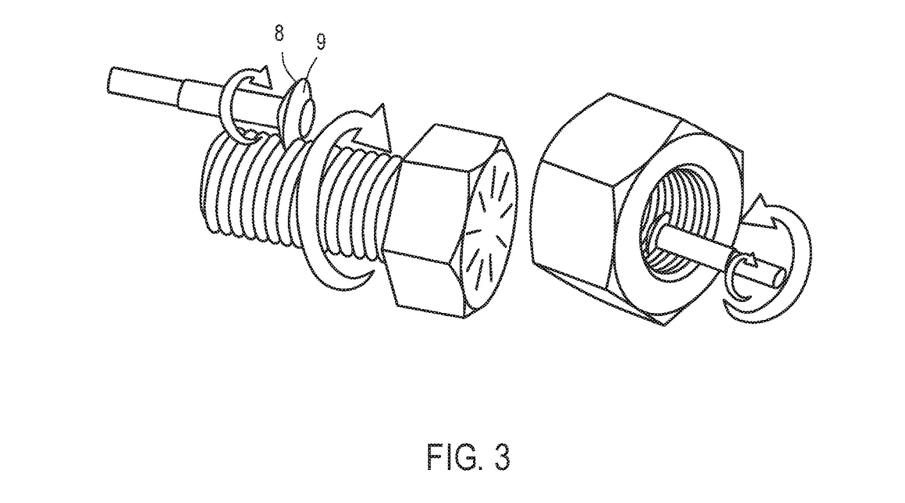
FIG. 3 depicts an exemplary tool of the present invention and its use in repairing threads of a bolt and a corresponding nut.

In some exemplary embodiments of the present invention, the thread repair tool comprises: a disc-shaped member having a first major surface, a second major surface opposite said first major surface, an outer periphery separating said first major surface from said second major surface, and an axis of rotation $A_R$ extending through and dissecting each of said first and second major surfaces; a shaft fixedly connected to or fixedly connectable to said disc-shaped member, said shaft extending from said second major surface of said disc-shaped member along said axis of rotation $A_R$; and an abrasive surface along said outer periphery, said abrasive surface comprising (i) an abrasive coating capable of abrading an object (e.g., a bolt or nut as shown in FIGS. 1 and 3), (ii) a plurality of aligned abrading teeth capable of abrading an object (e.g., a bolt or nut as shown in FIGS. 1 and 3), or (iii) both (i) and (ii).

The present invention is even further directed to kits comprising at least one thread repair tool of the present invention. In some exemplary embodiments of the present invention, the kit comprises: (I) one or more thread repair tools, wherein at least one of the one or more thread repair tools comprises a thread repair tool of the present invention, namely, a thread repair tool comprising: a disc-shaped member having a first major surface, a second major surface opposite the first major surface, an outer periphery separating the first major surface from the second major surface, and an axis of rotation extending through and dissecting each of the first and second major surfaces; a shaft extending from the second major surface of the disc-shaped member along the axis of rotation; and an abrasive coating along the outer periphery, the abrasive coating comprising an inorganic abrasive capable of abrading a metal object; (II) a hand-held powered device capable of rotating the disc-shaped member and the shaft along the axis of rotation, the hand-held powered device being selected from a drill, an electric/air grinder, and any combination thereof; (III) and a carrying case sized to house (i) the one or more thread repair tools (e.g., any or all of the proposed shapes and sizes described herein), and (ii) the hand-held powered device. Kits may further include, but are not limited to, cutting lubricant, a brush for cleaning threads, accessory wrenches for removing tool from included grinder, and the like.

The present invention is even further directed to methods of making thread repair tools. In some exemplary embodiments of the present invention, the method of making the thread repair tool of the present invention comprises: coating the outer periphery of any one of the herein-described disc-shaped members of the herein-described thread repair tools with the herein-described abrasive coating. The methods may further comprise steps including, but not limited to, forming the disc-shaped member and the shaft.

The present invention is even further directed to a method of using thread repair tools. In one exemplary embodiment, the method of using the thread repair tool of the present invention comprises: abrading an object with any one of the herein-described disc-shaped members of the herein-described thread repair tools. In some embodiments, the object comprises a thread-containing object such as a screw, a bolt or a nut.

These and other features and advantages of the present invention will become apparent after a review of the following detailed description of the disclosed embodiments and the appended claims.

DETAILED DESCRIPTION OF THE INVENTION

To promote an understanding of the principles of the present invention, descriptions of specific embodiments of the invention follow and specific language is used to describe the specific embodiments. It will nevertheless be understood that no limitation of the scope of the invention is intended by the use of specific language. Alterations, further modifications, and such further applications of the principles of the present invention discussed are contemplated as would normally occur to one ordinarily skilled in the art to which the invention pertains.

The present invention is directed to thread repair tools. The present invention is further directed to methods of making thread repair tools. The present invention is even further directed to methods of using thread repair tools.

As shown in FIGS. 1 and 3, exemplary thread repair tool 4 may be used to repair/restore a damaged flute profile present in various mechanical fasteners such as bolts, nuts, shaft threads and the like. The profiles include, but are not limited to, the various styles of thread profiles used in the industry as shown in FIGS. 4A-4G. As shown in FIGS. 4A-4G, unified threads, metric threads, square threads, ACME threads, buttress threads may be repaired using exemplary thread repair tool 4 of the present invention.

The profile and repair using exemplary thread repair tool 4 is not limited to that of thread profiles, and also includes repair of gear teeth, splines, ball screws and such. As shown in the figures, exemplary thread repair tool 4 has a mandrel stem/shaft 2, which extends out of a disc-shaped head/member 5 with a matching geometry of a given thread (or other profile) to be repaired and reconstructed. At least an outer periphery portion 8 of the tapered disc 5 is coated with various grits of diamond abrasive (or other abrasive) 10 to provide the cutting action required to reconstruct the damaged thread or flute.

Exemplary thread repair tool 4 can be chucked up into an air grinder, drill or the like, and rotated at high RPM's. This creates a specially profiled grinding wheel 5, which allows a user to reconstruct threads, which have been deformed or destroyed, and were unusable prior to using exemplary thread repair tool 4. Exemplary thread repair tool 4 grinds into the deformed threads and is shaped to follow the original thread path, which is already established, allowing exemplary thread repair tool 4 to follow the flute path through the damaged area, while maintaining continuity of thread path.

Exemplary thread repair tool 4 and the methods of use disclosed herein improves upon all prior methods of reconstructing thread profiles and does so with speed, accuracy, and consistency. This prevents shutdowns and otherwise costly tear downs of equipment where thread damage has occurred, allowing for in field maintenance and repair, preventing the need to disassemble machines to remove damaged parts. This also allows for individuals to repair their own threads without having to take to machine shops and the like.

Figure 2:
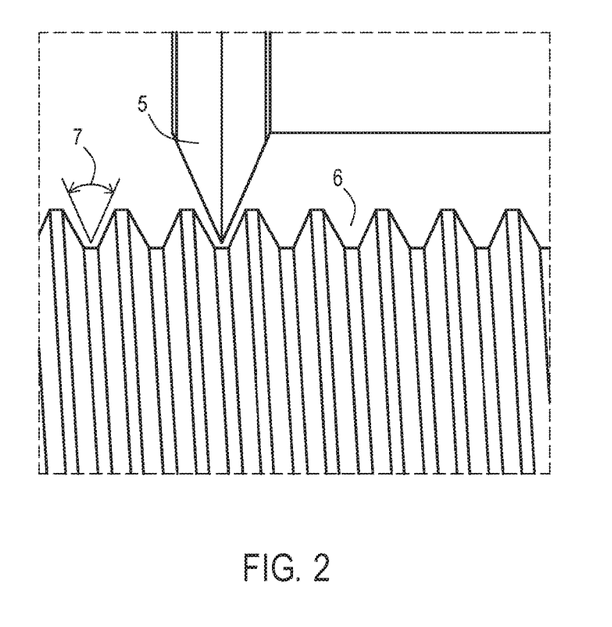
FIG. 2 depicts an exploded view of section A shown in FIG. 1.
Figure 4A:
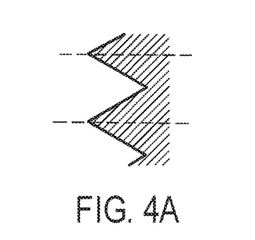
FIGS. 4A-4G depict exemplary thread profiles commonly used in the industry.
Figure 4B:
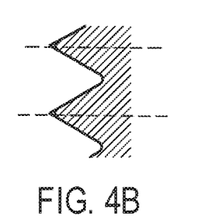
Figure 4C:
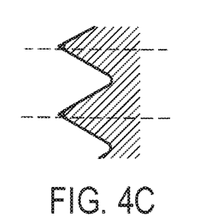
Figure 4D:
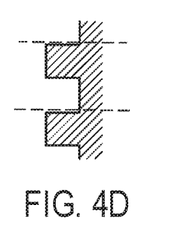
Figure 4E:
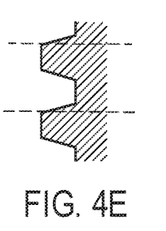
Figure 4F:
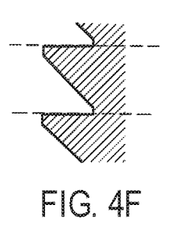
Figure 4G:
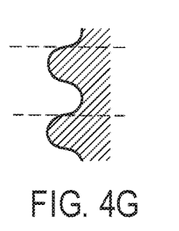
Figure 6A:
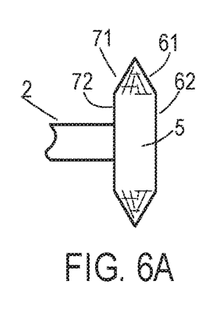
FIGS. 6A-6G depict exemplary tools that could be used to abrade defects in the exemplary thread profiles shown in FIGS. 4A-4G.
Figure 6B:
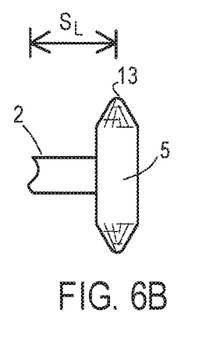
Figure 6C:
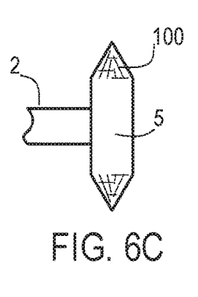
Figure 6D:
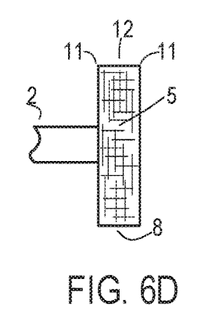
Figure 6E:
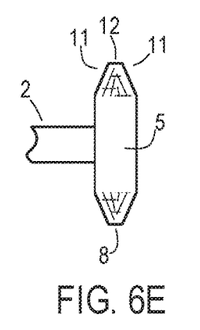
Figure 6F:
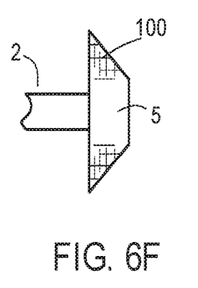

The thread repair tool of the present invention is very simple in its design, yet very effective in its purpose. As briefly described and shown in FIGS. 1-13b, exemplary thread repair tool 4 demonstrates what is taking place with the marriage of the male grinding disc 5 and the female thread profile. As shown in FIGS. 1-2, exemplary thread repair tool 4 with disc-shaped head/member 5 has a surface profile (i.e., the combination of first major surface 6/second major surface 7/outer periphery 8) that matches that of a single flute shown as item 6 in FIG. 2. In this example, fortunately for common metric, unified threads and even pipe threads, the only requirement is that the angle (shown as item 7. In FIG. 2) be at 60° by industry standard. The same is true for any profile, such as those shown in FIGS. 4A-4G. For instance, FIG. 4E shows an ACME thread, which if damaged, would require an exemplary thread repair tool 4 to have the same profile such as exemplary thread repair tool 4 shown in FIG. 6E. This includes the shown 29° angle and its flats, resulting in a profile which matches the ACME thread.

One of the main advantages of the thread repair tools of the present invention is that the thread repair tools are not restricted to use on certain thread pitches. A given thread repair tool can be matched with the profile of a given flute of a given thread-containing object. Whatever the profile, a given thread repair tool can be rotated at high RPM by an air grinder tool, drill, or the like, to create a circular cutting/grinding action relative to the hand tool. The rotation applies an abrading force around the damaged part thread perimeter as shown, for example, in FIG. 3, following the existing thread pattern.

While prior art methods (e.g., U.S. Pat. No. 1,694,229) requires a sawing hand motion, the thread repair tools of the present invention utilize a rotation head 5, driven by a chucked up mandrel/shaft 2. The mandrel/shaft 2 coming from the profile cutting disc 5 can be sized to fit numerous industrial collet standards (i.e., ⅛ inch, ¼ inch, ½ inch, etc.). Also the length of the mandrel/shaft 2 may vary depending on the application. Exemplary thread repair tool 4 shown in FIGS. 1-3 has a two-inch overall length $S_L$. The diameter $d_D$ of the cutting head 5 may vary as well. To accompany smaller and larger parts, the head 5 will perform better with a larger diameter grinding disc 5 when using on larger diameter circumference parts.

The base material use to form exemplary thread repair tool 4, and its components, may be any metal, composite, and plastic rigid enough to handle biaxial loads placed on it from thread forming. Such metals may include 1045 Turn, Ground, and Polished (TG&P) steel, 4140 Preheat treated steel which is at 27-32 Rockwell. Many other metals are obviously included and it is not limited to these listed. Other materials which may be used to make tools include, but are not limited to, various rigid fiber, paper, and resin-based cardboards, that are rigid enough and reinforced enough to hold a thread profile. These non-metal materials provide a more economical alternative to metal based tools. In some embodiments, the tool is reusable. In other embodiments, the tool is disposable after one use. In some embodiments, the shaft portion of the tool is reusable, but the disc body portion of the tool is disposable after one or more uses.

Some of the materials, such as resin-based versions of tool, may comprise a composite material comprising abrasive material and resin, which may be combined and formed, for example, in a mold, which results in a tool which is not plated, but rather impregnated with the cutting agents. This alternative is true for any embodiments whether the entire tool is the abrasive host, or if the coated surface being the abrasive host. Some embodiments may include a similar approach where the base tool material is one of a plastic, metal, or paper and cutting head 5 is coated or formed with a similar type resin/abrasive composite material to form an abrasive surface on the cutting head 5.

The surface (i.e., portions of the combination of first major surface 6/second major surface 7/outer periphery 8) of the cutting head 5 is coated with a wear resistant abrasive. The abrasive 9 can be any grit tailored to which is determined best for application. Diamond and cubic boron nitride aggregate is an expected choice for most industrial applications due to their known hardness scale, thermal stability, and wear-ability; however, in home applications, or ones which there is not a need for industrial or continuous usage, a more cost-effective abrasive may be substituted. Examples of these substitutions include, but are not limited to, aluminum oxide, Emory, silicon carbide, and the like.

The present invention includes all methods of adhering these various aggregates to discs. The methods include, but are not limited to, electroplating bonds using nickel (or other metal filler) adhesion using anodes and cathodes, vitrified bonding, molecular bonds, or vacuum style abrading, all of which are currently used in the industry. Grits, adhesion types, and grade quality of aggregate may vary depending on tool life required, quality of restoration needed as well as substrate repairing. For the threads requiring liquid sealing properties, such as pipe fittings and the like, finishing the repair with a high grit cutter will improve surface finish on restoration and provide a more consistent surface topography. For plastics, a more open course structure would typically be required to prevent plastic dust from collecting into the pores of the abrasive, thus preventing further cutting. An open structure would prove to prevent this and provide more consistent material removal.

Aside from using abrasive to do the repair and material removal, the present invention is further directed tools with serrations of cutting edged ground into the tool, which acts as the abrasive surface. These cutting teeth are formed, sharpened, and cover 91 the lead edge comprising of disc-shaped member 5 having a first major surface 6, second major surface 7 opposite said first major surface 6, an outer periphery 8 separating said first major surface 6 from said second major surface 7. This area is covered in flute edges 91 which will perform the cutting and material removal. This method of tool can be formed from a solid carbide material, comprising of both shaft 2 and head 5 being pressed and/or manufactured from solid carbide. Using materials like 4140 pre-heat treat as the core material in which the carbide formed cutting head 5 would be soldered on (or screwed on) to shaft 2. Either way the cutting head relies on carbide flutes, versus abrasive to function.

The thread repair tools of the present invention and methods of making and using thread repair tools of the present invention are further described in the embodiments below.

Thread Repair Tool Embodiments:

1. A thread repair tool 4 comprising: a disc-shaped member 5 having a first major surface 6, a second major surface 7 opposite said first major surface 6, an outer periphery 8 separating said first major surface 6 from said second major surface 7, and an axis of rotation $A_R$ extending through and dissecting each of said first and second major surfaces 6/7; a shaft 2 fixedly connected to or fixedly connectable to said disc-shaped member 5, said shaft 2 extending from said second major surface 7 of said disc-shaped member 5 along said axis of rotation $A_R$; and an abrasive surface 9 along said outer periphery 8, said abrasive surface 9 comprising (i) an abrasive coating 10 capable of abrading an object (e.g., a bolt or nut as shown in FIGS. 1 and 3), (ii) a plurality of aligned abrading teeth 90 capable of abrading an object (e.g., a bolt or nut as shown in FIGS. 1 and 3), or (iii) both (i) and (ii). As used herein, the phrase "fixedly connected" refers to two objects that are connected to one another such that rotation of either one the two objects causes the other object to rotate in concert. In this embodiment, when shaft 2 is "fixedly connected" to disc-shaped member 5, rotation of shaft 2 along axis of rotation $A_R$ causes disc-shaped member 5 to rotate along axis of rotation $A_R$ at the same revolutions per minute (RPM). The term "fixedly connected" specifically excludes the combination of a disc-shaped member and a shaft in which the disc-shaped member freely rotates around the shaft. As used herein, the phrase "fixedly connectable" refers to two objects that are connectable to one another so as to form a "fixedly connected" combination (e.g., the "fixedly connected" combination of shaft 2 and disc-shaped member 5).

2. The thread repair tool 4 of embodiment 1, wherein said disc-shaped member 5 has a disc diameter $d_D$, said disc diameter $d_D$, having a length of less than about 6.0 inches (in).

3. The thread repair tool 4 of embodiment 1 or 2, wherein said disc-shaped member 5 has a disc diameter $d_D$, said disc diameter $d_D$ having a length of from about 0.375 inches to about 3.0 inches 4. The thread repair tool 4 of any one of embodiments 1 to 3, wherein said disc-shaped member 5 has a disc diameter $d_D$, said disc diameter $d_D$ having a length of from about 1.0 in.

5. The thread repair tool 4 of any one of embodiments 1 to 4, wherein at least a portion 6' of said first major surface 6 is in a tapered relationship relative to at least a portion 7' of said second major surface 7. When a portion 6' of said first major surface 6 is in a tapered relationship relative to a portion 7' of said second major surface 7, portion 6' may form an angle α with portion 7', wherein angle α ranges from about 15° to about 90°, or any angle α value including endpoint values 15° and 90°, and any angle α value between 15° and 90°, in increments of 0.1°, e.g., 60.0°, or any range of values between 15° and 90°, in increments of 0.1°, e.g., from 35.6° to 62.4°.

6. The thread repair tool 4 of any one of embodiments 1 to 5, wherein at least a portion 6" of said first major surface 6 is substantially parallel to at least a portion 7" of said second major surface 7.

Figure 5:
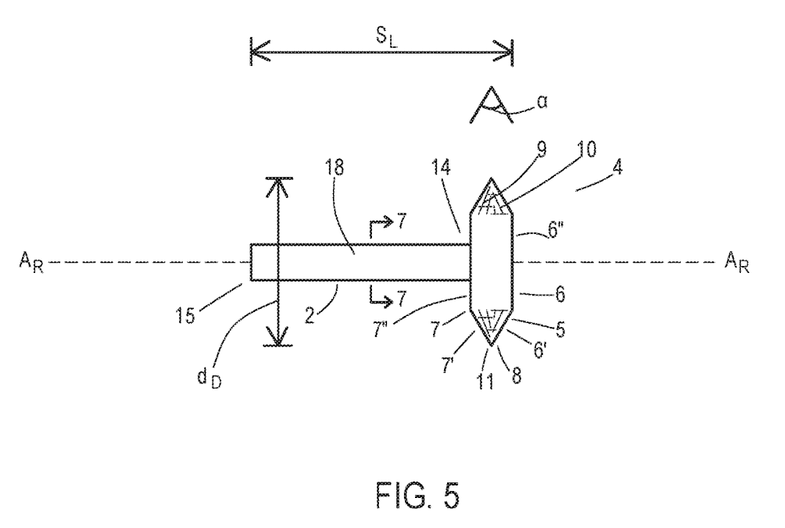
FIG. 5 depicts an exemplary tool of the present invention.

7. The thread repair tool 4 of any one of embodiments 1 to 6, wherein said outer periphery 8 comprises a single edge 11 separating said first major surface 6 from said second major surface 7. See, for example, the exemplary tool 4 shown in FIG. 5.

8. The thread repair tool 4 of any one of embodiments 1 to 6, wherein said outer periphery 8 comprises two or more edges 11 separating said first major surface 6 from said second major surface 7. See, for example, the exemplary tools 4 shown in FIGS. 6D-6E.

9. The thread repair tool 4 of any one of embodiments 1 to 6 and 8, wherein said outer periphery 8 comprises (i) two or more edges 11, and (ii) at least one edge surface 12 extending between said two or more edges 11 so as to separate said first major surface 6 from said second major surface 7. See again, the exemplary tools 4 shown in FIGS. 6D-6E.

Figure 6G:
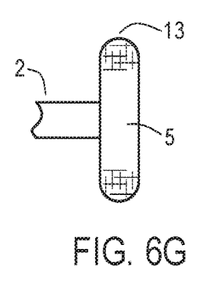

10. The thread repair tool 4 of any one of embodiments 1 to 6, 8 and 9, wherein said outer periphery 8 comprises a curved surface profile 13 separating said first major surface 6 from said second major surface 7. See, for example, the exemplary tools 4 shown in FIGS. 6B and 6G.

11. The thread repair tool 4 of any one of embodiments 1 to 10, wherein said shaft 2 extends through said disc-shaped member 5 from said first major surface 6 to said second major surface 7.

Figure 7:
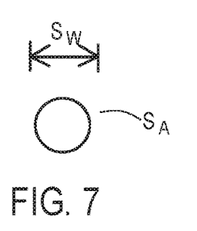
FIG. 7 depicts a cross-sectional area of the shaft shown in FIG. 5 along line 7-7 shown in FIG. 5.

12. The thread repair tool 4 of any one of embodiments 1 to 11, wherein said shaft 2 has a first shaft end 14 fixedly connected to or fixedly connectable to said disc-shaped member 5, a second shaft end 15 positioned away from said disc-shaped member 5, and a shaft cross-sectional area $S_A$ along a shaft length $S_L$ between said first shaft end and said second shaft end. See, exemplary shaft cross-sectional area $S_A$ shown in FIG. 7.

13. The thread repair tool 4 of any one of embodiments 1 to 12, wherein said shaft 2 has a shaft cross-sectional area $S_A$ that varies along a shaft length $S_L$.

14. The thread repair tool 4 of embodiment 12 or 13, wherein said shaft cross-sectional area $S_A$ has a circular configuration at a first location 18 along said shaft length $S_L$.

15. The thread repair tool of any one of embodiments 1 to 14, wherein said shaft 2 does not extend beyond said first major surface 6 of said disc-shaped member 5.

16. The thread repair tool 4 of any one of embodiments 1 to 15, wherein said shaft 2 has a shaft length $S_L$ of less than about 12 in and a shaft diameter (or shaft width) $S_W$ of less than about 1.0 in.

17. The thread repair tool 4 of any one of embodiments 1 to 16, wherein said shaft 2 has a shaft length $S_L$ of from about 1.0 in to about 6.0 in, and a shaft diameter (or shaft width) $S_W$ of from about 0.2 in to about 0.6 in.

18. The thread repair tool 4 of any one of embodiments 12 to 17, wherein said second shaft end 15 has an end profile shape and size that enables said second shaft end 15 to be clasped by a drill (similar to a drill bit) (not shown).

19. The thread repair tool 4 of any one of embodiments 1 to 18, wherein each of said disc-shaped member 5 and said shaft 2 independently comprises a metal, a polymer, a resin, paper, fiber, inorganic material, organic material, or a composite material depending on application. As used herein, a "composite" material comprises any combination of a metal, a polymer, a resin, paper, fiber, inorganic material, and/or organic material. For example, a metal particle or inorganic particle filled polymer matrix or resin matrix or impregnated paper or nonwoven may be a suitable composite material for forming said shaft 2 and/or said disc-shaped member 5 and/or said abrasive surface 9 of said disc-shaped member 5.

20. The thread repair tool 4 of any one of embodiments 1 to 19, wherein said shaft 2 comprises (i) a metal selected from aluminum, steel, 4140 steel (i.e., a chromium-molybdenun alloy steel), carbide steel (e.g., a tungsten carbide steel), or stainless steel, (ii) a polymeric or resin material, or (iii) a composite material.

21. The thread repair tool 4 of any one of embodiments 1 to 20, wherein said disc-shaped member 5 comprises (i) a metal selected from aluminum, steel, 4140 steel (i.e., a chromium-molybdenun alloy steel), carbide steel (e.g., a tungsten carbide steel), (ii) a polymeric or resin material, (iii) a composite material, or (iv) any combination of (i) to (iii).

22. The thread repair tool 4 of any one of embodiments 1 to 21, wherein (i) said shaft 2 comprises a metal selected from 4140 steel (i.e., a chromium-molybdenun alloy steel) and carbide steel (e.g., a tungsten carbide steel), and (ii) said disc-shaped member 5 comprises a metal selected from 4140 steel (i.e., a chromium-molybdenum alloy steel) and carbide steel.

23. The thread repair tool 4 of any one of embodiments 1 to 22, wherein (i) said shaft 2 comprises a metal, and (ii) said disc-shaped member 5 comprises a composite material comprising (a) a polymer or resin matrix, and (b) an abrasive filler at least partially within the polymer or resin matrix, the abrasive filler comprising metal particles, inorganic particles, fibers, or any combination thereof.

24. The thread repair tool 4 of any one of embodiments 1 to 21, wherein (i) said shaft 2 comprises a polymeric or resin material, or a composite material; and (ii) said disc-shaped member 5 comprises a polymeric or resin material, or a composite material.

25. The thread repair tool 4 of any one of embodiments 1 to 24, wherein said abrasive surface 9 extends along an outer edge periphery 61/71 of each of said first and second major surfaces 6/7.

26. The thread repair tool 4 of any one of embodiments 1 to 25, wherein said abrasive surface 9 covers an outer edge periphery 61/71 of each of said first and second major surfaces 6/7, but does not cover an inner major surface portion 62/72 of each of said first and second major surfaces 6/7.

27. The thread repair tool 4 of any one of embodiments 1 to 26, wherein said abrasive surface 9 comprises an abrasive coating 10 that forms at least a portion of an outer surface of said disc-shaped member 5 along said outer periphery 8.

28. The thread repair tool 4 of any one of embodiments 1 to 26, wherein said abrasive surface 9 comprises an abrasive cap or ring 95 that extends over at least a portion of said disc-shaped member 5 along said outer periphery 8, said abrasive cap or ring 95 comprising an abrasive coating 10 thereon.

29. The thread repair tool 4 of embodiment 28, wherein said abrasive cap or ring 95 comprises a paper or nonwoven fabric substrate coated and/or impregnated with said abrasive coating 10 thereon.

30. The thread repair tool 4 of any one of embodiments 27 to 29, wherein said abrasive coating 10 comprises an inorganic abrasive 100 comprises aluminum oxide, zirconia alumina, silicon carbide, ceramic aluminum oxide, diamond, cubic boron nitride, or any combinations thereof.

31. The thread repair tool 4 of embodiment 30, wherein said inorganic abrasive 100 comprises diamond.

32. The thread repair tool 4 of any one of embodiments 27 to 29, wherein said abrasive coating 10 comprises a polymer or resin binder material (e.g., an epoxy resin) filled with abrasive material.

33. The thread repair tool 4 of any one of embodiments 1 to 32, wherein said abrasive surface 9 comprises a plurality of aligned abrading teeth 90 capable of abrading an object (e.g., a bolt or nut as shown in FIGS. 1 and 3).

34. The thread repair tool 4 of embodiment 33, wherein said plurality of aligned abrading teeth 90 comprise metal teeth 91. See, for example, FIG. 13b.

35. The thread repair tool 4 of embodiment 33, wherein said plurality of aligned abrading teeth 90 comprise carbide steel teeth 91.

36. The thread repair tool 4 of any one of embodiments 1 to 35, wherein said shaft 2 is fixedly connected to and integrally connected to said disc-shaped member 5. For example, shaft 2 and disc-shaped member 5 may be formed as a single piece via a machining or thermoforming step.

Figure 8:
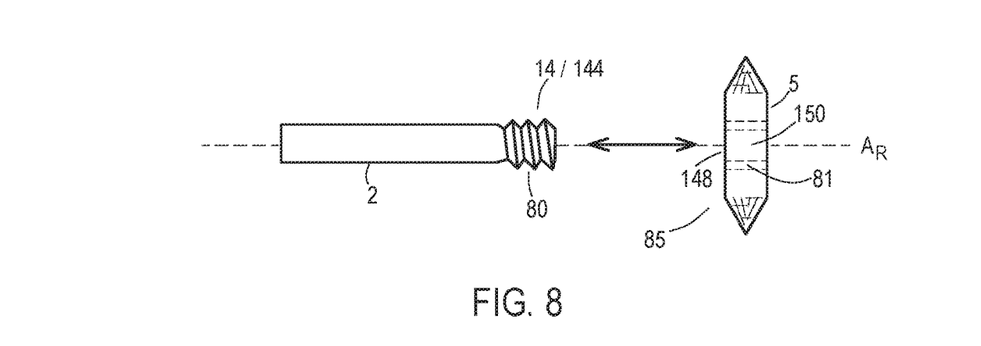
FIG. 8 depicts an exemplary tool of the present invention showing a threaded stud style connection between a mandrel and a separable head.
Figure 9:
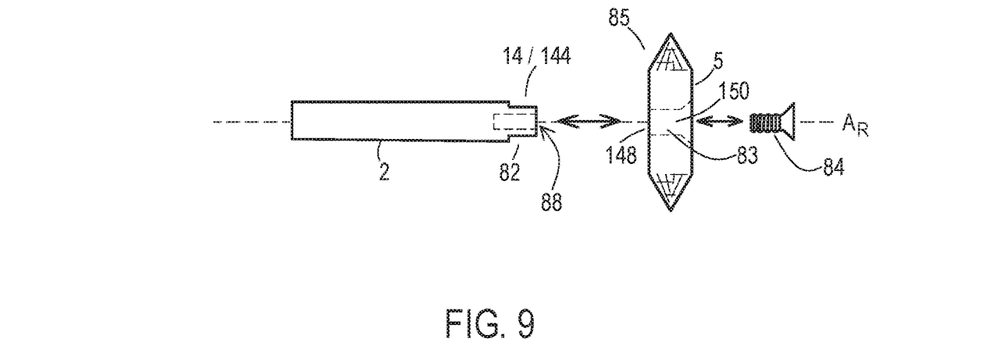
FIG. 9 depicts an exemplary tool of the present invention showing a slip fit slightly tapered mandrel and a screw for connecting separable head to the mandrel.
Figure 10:
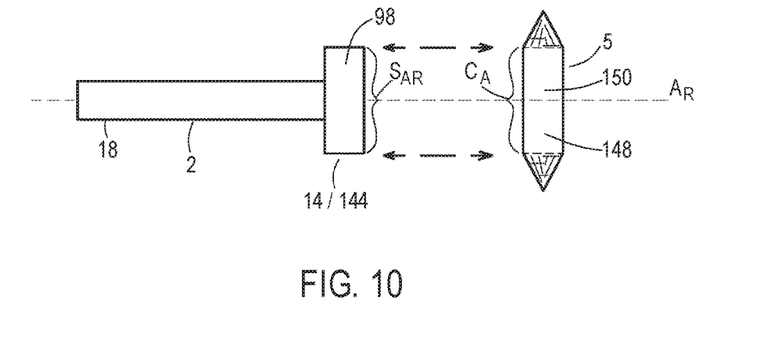
FIG. 10 depicts an exemplary tool of the present invention showing a mandrel connecting end being inserted into a separable head.
Figure 11:
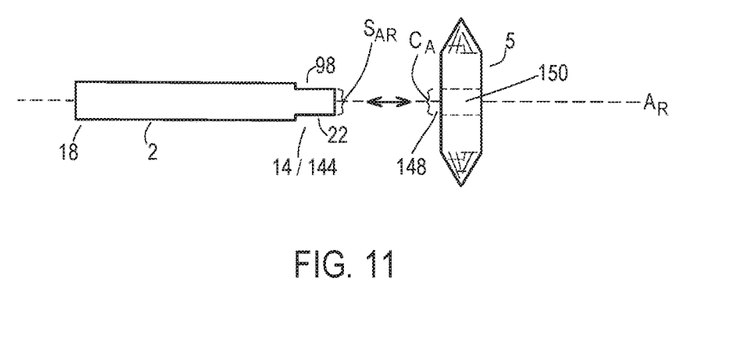
FIG. 11 depicts an exemplary tool of the present invention showing a separable head being pressed onto a mandrel connecting end with a mechanical interference press fit.
Figure 12A:
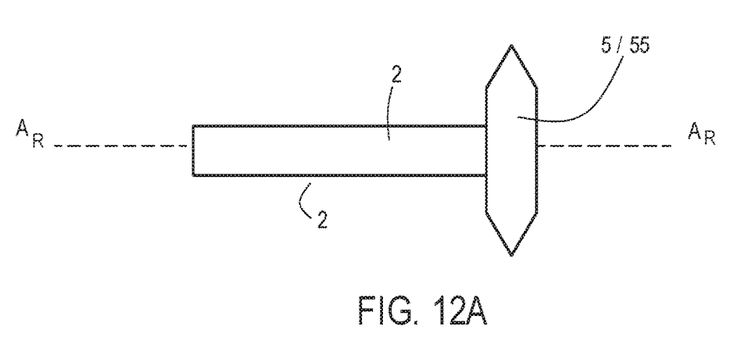
FIG. 12A depicts an exemplary tool of the present invention showing a common core mandrel with an exemplary connected separable head.
Figure 12B:
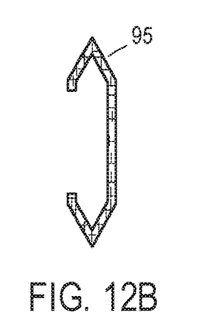
FIGS. 12B-12C depict interchangeable variations of paper or plastic based disposable caps with FIG. 12B showing a head cap version, and FIG. 12C showing a doughnut style version, with both being paper/composite style economical sanding heads (liners/caps)
Figure 12C:
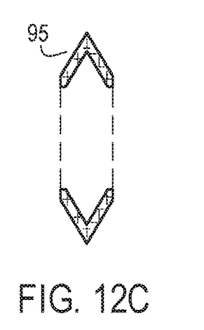
Figure 13A:
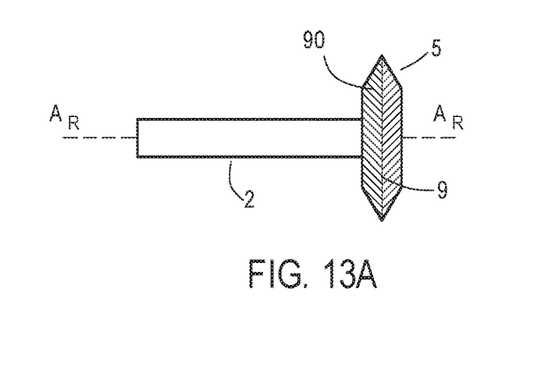
FIG. 13A depicts an exemplary tool of the present invention showing a carbide core material or the like and forming cutting teeth into the head 5 by means of pressure and sharpening.
Figure 13B:
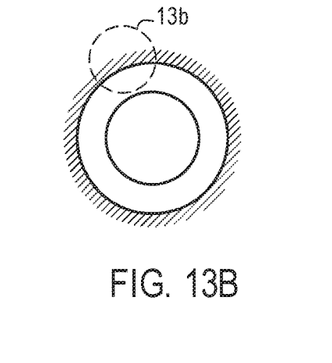
FIG. 13B depicts an end view of the exemplary tool shown in FIG. 13A as viewed from the head-side of the exemplary tool.
Figure 13C:
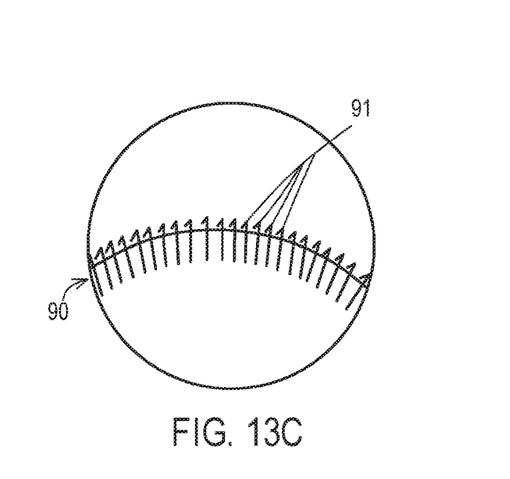
FIG. 13C depicts a close-up view of an exemplary cutting surface of the exemplary tool shown in FIG. 13A.

37. The thread repair tool 4 of any one of embodiments 1 to 35, wherein said shaft 2 is separable from and fixedly connectable to said disc-shaped member 5. For example, shaft 2 and disc-shaped member 5 may be formed in separate machining or thermoforming steps with connecting portions that form a fixedly connected assembly. In some cases, disc-shaped member 5 may be manufactured separate from shaft 2, wherein shaft 2 would be sized appropriately for a pressed interference fit assembled prior to packaging as shown in FIG. 11. This might be the case for larger diameter disc-shaped members 5, to reduce manufacturing cost and material waste from machining or manufacturing from single stock material. In either case, the tool 4 may or may not come joined as one piece prior to packaging. Methods for connecting the shaft 2 to disc-shaped member 5 can be achieved in various ways as shown in FIGS. 8-12. FIG. 8 demonstrates a threaded connection, showing male thread 80 mating to female thread 81. FIG. 9 demonstrates a tapered interference fit accomplished by a tapered end 82 of shaft 2 mating with a tapered hole 83 of disc-shaped member 5 and then making use of a retaining screw 84 to draw the two pieces together. FIG. 10 demonstrates a pressed mechanical interference fit of a ring 95 which comprises only surface portions 6' and 7' respectively on a ring 95 which then is pressed onto mandrel 98 of shaft 2 with an oversized head 2. FIG. 11 demonstrates the entire disc-shaped member 5 being pressed on to shaft end 22 with a mechanical interference fit. FIG. 12 demonstrates economical replacement caps, liners, and such 95 wherein the abrasive surface 9 is manufactured separately from disc-shaped member 5, whereas these formed shapes 95 can snap onto disc-shaped member 5 as shown, or alternatively, be attached to disc-shaped member 5 via, for example, an adhesive. This results in an economical alternative to replacing cutting portion(s) 9 of thread repair tools 4.

38. The thread repair tool 4 of any one of embodiments 1 to 35 and 37, wherein said shaft 2 has a first shaft end 14 with a first shaft end outer profile 144 that is fixedly connectable to a corresponding connection profile 148 within said second major surface 7 of said disc-shaped member 5.

39. The thread repair tool 4 of embodiment 38, wherein said first shaft end outer profile 144 comprises external shaft threads 80 and said corresponding connection profile 148 comprises a cavity 150 with corresponding threads 81 extending along an inner surface of said cavity 150. See, for example, exemplary tool 4 shown in FIG. 8.

40. The thread repair tool 4 of embodiment 38, wherein said first shaft end outer profile 144 comprises a shaft end portion 82 and internal shaft threads 88 within said shaft end portion 82, and said corresponding connection profile 148 comprises a cavity 150 sized to receive said shaft end portion 82 from said second major surface 7 of said disc-shaped member 5, and a connecting member (e.g., screw) 84 from said first major surface 6 of said disc-shaped member 5. See, for example, exemplary tool 4 shown in FIG. 9.

41. The thread repair tool 4 of embodiment 38, wherein said first shaft end outer profile 144 comprises a shaft end portion 98 having a shaped shaft cross-sectional area $S_{AR}$ extending substantially perpendicular to said axis of rotation $A_R$, said shaped shaft cross-sectional area $S_{AR}$ being greater than a shaft cross-sectional area $S_A$ extending substantially perpendicular to said axis of rotation $A_R$ and being between said shaft end portion 98 and a second shaft end 15 opposite said first shaft end 14, and said corresponding connection profile 148 comprises a cavity 150 along said second major surface 7 of said disc-shaped member 5, said cavity 150 having a cavity cross-sectional area $C_A$ extending substantially perpendicular to said axis of rotation $A_R$, said cavity cross-sectional area $C_A$ being greater than said shaft cross-sectional area $S_A$. See, for example, exemplary tool 4 shown in FIG. 10.

42. The thread repair tool 4 of embodiment 38, wherein said first shaft end outer profile 144 comprises a shaft end portion 80 having a reduced shaft cross-sectional area $S_{AR}$ extending substantially perpendicular to said axis of rotation $A_R$, said reduced shaft cross-sectional area $S_{AR}$ being less than a shaft cross-sectional area $S_A$ extending substantially perpendicular to said axis of rotation $A_R$ and being between said shaft end portion 98 and a second shaft end 15 opposite said first shaft end 14, and said corresponding connection profile 148 comprises a cavity 150 along said second major surface 7 of said disc-shaped member 5, said cavity 150 having a cavity cross-sectional area $C_A$ extending substantially perpendicular to said axis of rotation $A_R$, said cavity cross-sectional area $C_A$ being less than said shaft cross-sectional area $S_A$. See, for example, exemplary tool 4 shown in FIG. 11.

43. The thread repair tool 4 of any one of embodiments 1 to 42, further comprising a hand-held powered device (not shown) capable of rotating said disc-shaped member 5 and said shaft 2 along said axis of rotation $A_R$.

44. The thread repair tool 4 of any one of embodiments 1 to 43, further comprising a hand-held powered device (not shown) capable of rotating said disc-shaped member 5 and said shaft 2 along said axis of rotation $A_R$, said hand-held powered device being selected from a drill, an air/electric grinder, and any combination thereof.

Kit Embodiments:

45. A kit comprising: one or more thread repair tools, wherein at least one of the one or more thread repair tools comprises the thread repair tool 4 of any one of embodiments 1 to 42.

46. The kit of embodiment 45, further comprising one or more of: a hand-held powered device (not shown) capable of rotating said disc-shaped member 5 and said shaft 2 along said axis of rotation $A_R$, said hand-held powered device being selected from a drill, an air grinder, an electric grinder, and any combination thereof; a carrying case (not shown) sized to house (i) the one or more thread repair tools 4, and (ii) the hand-held powered device; cutting lubricant; cleaning fluid; a brush for cleaning threads; and one or more accessory wrenches for removing thread repair tool 4 from a drill or grinder.

Methods of Making Thread Repair Tool Embodiments:

47. A method of making the thread repair tool 4 of any one of embodiments 1 to 44, said method comprising: forming an abrasive surface 9 along the outer periphery 8 of the disc-shaped member 5.

48. The method of embodiment 47, wherein said forming step comprises coating the outer periphery 8 of the disc-shaped member 5 with an abrasive coating 10 so as to form abrasive surface 9.

49. The method of embodiment 47, wherein said forming step comprises forming the disc-shaped member 5 with one or more materials, wherein the one or more materials form a disc-shaped member body 55 with abrasive surface 9 thereon.

50. The method of embodiment 49, wherein said disc-shaped member 5 is formed via a molding step.

51. The method of embodiment 47, wherein said forming step comprises covering the outer periphery 8 of the disc-shaped member 5 with an abrasive cap or ring 95 having the abrasive surface 9 thereon coating 10 so as to form abrasive surface 9.

52. The method of embodiment 51, wherein the abrasive cap or ring 95 comprises a paper or nonwoven substrate coated and/or impregnated with a resin binder and optional abrasive material (e.g., metal particles).

53. The method of embodiment 47, wherein said forming step comprises forming a plurality of aligned teeth 90 along the outer periphery 8 of the disc-shaped member 5.

54. The method of embodiment 53, wherein the plurality of aligned teeth 90 comprise carbide metal teeth 91.

55. The method of any one of embodiments 47 to 54, further comprising: forming the disc-shaped member 5 and the shaft 2.

56. The method of embodiment 55, wherein said forming the disc-shaped member 5 and the shaft 2 step comprises a single step in which both the disc-shaped member 5 and the shaft 2 are formed simultaneously and integrally connected and fixedly connected to one another.

57. The method of embodiment 55, wherein said forming the disc-shaped member 5 and the shaft 2 step comprises two separate steps in which the disc-shaped member 5 is formed in a first step, and the shaft 2 is formed in a separate second step, the disc-shaped member 5 and the shaft 2 being fixedly connectable with one another.

Methods of Using Thread Repair Tool Embodiments:

58. A method of using the thread repair tool 4 of any one of embodiments 1 to 44, said method comprising: abrading an object (e.g., a nut and/or bolt such as those shown in FIGS. 1 and 3) with the disc-shaped member 5 of the thread repair tool 4 of any one of embodiments 1 to 44.

59. The method of embodiment 58, wherein the object comprises a thread-containing object.

60. The method of embodiment 58 or 59, wherein the object comprises a screw, a bolt or a nut.

61. The method of any one of embodiments 58 to 60, further comprising: connecting the disc-shaped member 5 of the thread repair tool 4 to the shaft 2 of the thread repair tool 4.

62. The method of any one of embodiments 58 to 61, further comprising: replacing the disc-shaped member 5 of the shaft 2 with a replacement disc-shaped member 5.

63. The method of any one of embodiments 58 to 62, further comprising: choosing the disc-shaped member 5 and the shaft 2 from a plurality of disc-shaped members 5 and shafts 2 within the kit of embodiments 45 or 46.

64. The method of any one of embodiments 58 to 63, further comprising: connecting a second end of the shaft 2 to a hand-held powered device (not shown).

The present invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

EXAMPLE 1

Preparation of Thread Repair Tools

Exemplary thread repair tools 4 as shown in FIGS. 1-13b were prepared.

It should be understood that although the above-described thread repair tools 4 and/or methods are described as "comprising" one or more components or steps, the above-described thread repair tools 4 and/or methods may "comprise," "consists of," or "consist essentially of" the above-described components, features or steps of the thread repair tools 4 and/or methods. Consequently, where the present invention, or a portion thereof, has been described with an open-ended term such as "comprising," it should be readily understood that (unless otherwise stated) the description of the present invention, or the portion thereof, should also be interpreted to describe the present invention, or a portion thereof, using the terms "consisting essentially of" or "consisting of" or variations thereof as discussed below.

As used herein, the terms "comprises," "comprising," "includes," "including," "has," "having," "contains", "containing," "characterized by" or any other variation thereof, are intended to encompass a non-exclusive inclusion, subject to any limitation explicitly indicated otherwise, of the recited components. For example, a thread repair tool 4 and/or method that "comprises" a list of elements (e.g., components, features, or steps) is not necessarily limited to only those elements (or components or steps), but may include other elements (or components or steps) not expressly listed or inherent to the thread repair tool 4 and/or method.

As used herein, the transitional phrases "consists of" and "consisting of" exclude any element, step, or component not specified. For example, "consists of" or "consisting of" used in a claim would limit the claim to the components, materials or steps specifically recited in the claim except for impurities ordinarily associated therewith (i.e., impurities within a given component). When the phrase "consists of" or "consisting of" appears in a clause of the body of a claim, rather than immediately following the preamble, the phrase "consists of" or "consisting of" limits only the elements (or components or steps) set forth in that clause; other elements (or components) are not excluded from the claim as a whole.

As used herein, the transitional phrases "consists essentially of" and "consisting essentially of" are used to define a thread repair tool 4 and/or method that includes materials, steps, features, components, or elements, in addition to those literally disclosed, provided that these additional materials, steps, features, components, or elements do not materially affect the basic and novel characteristic(s) of the claimed invention. The term "consisting essentially of" occupies a middle ground between "comprising" and "consisting of".

Further, it should be understood that the herein-described thread repair tools 4 and/or methods may comprise, consist essentially of, or consist of any of the herein-described components, features and steps, as shown in the figures with or without any feature(s) not shown in the figures. In other words, in some embodiments, the thread repair tools 4 and/or methods of the present invention do not have any additional features other than those shown in the figures, and such additional features, not shown in the figures, are specifically excluded from the thread repair tools 4 and/or methods. In other embodiments, the thread repair tools 4 and/or methods of the present invention do have one or more additional features that are not shown in the figures.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A thread repair tool sized and shaped for use with a hand-held powered device, said thread repair tool consisting of:
   a disc-shaped member having a first major surface, a second major surface opposite said first major surface, an outer periphery separating said first major surface from said second major surface, and an axis of rotation $A_R$ extending through and dissecting each of said first and second major surfaces, said disc-shaped member having a disc diameter $d_D$ of from about 0.375 inches (in) to about 3.0 in;
   a shaft fixedly connected to or fixedly connectable to said disc-shaped member, said shaft extending from said second major surface of said disc-shaped member along said axis of rotation $A_R$, said shaft having (a) a cross-sectional area $S_A$ along a shaft length $S_L$ between (i) said second major surface of said disc-shaped member, proximate a first shaft end of said shaft, and (ii) a second shaft end positioned away from said disc-shaped member, (b) a shaft length $S_L$ of from about 1.0 in to about 6.0 in, and (c) a shaft diameter $S_W$ of from about 0.2 in to about 0.6 in;
   an optional connecting member that connects said disc-shaped member to said shaft; and
   an abrasive surface along said outer periphery, said abrasive surface being capable of abrading an object, and consisting of diamond, cubic boron nitride, carbide steel, or 4140 steel, and optionally a metal filler used for adhesion.

2. The thread repair tool of claim 1, wherein said shaft extends through said disc-shaped member from said first major surface to said second major surface.

3. The thread repair tool of claim 1, wherein said second shaft end has an end profile shape and size that enables said second shaft end to be clasped by the hand-held powered device, the hand-held powered device being a drill.

4. The thread repair tool of claim 1, wherein said shaft consists of (i) a metal selected from aluminum, steel, 4140 steel, carbide steel, or stainless steel, (ii) a polymeric or resin material, or (iii) a composite material, and said disc-shaped member consists of (i) a metal selected from aluminum, steel, 4140 steel, carbide steel, (ii) a polymeric or resin material, (iii) a composite material, or (iv) any combination of (i) to (iii).

5. The thread repair tool of claim 1, wherein said abrasive surface extends along an outer edge periphery of each of said first and second major surfaces.

6. The thread repair tool of claim 1, wherein said abrasive surface consists of diamond and the metal filler, and the metal filler consists of nickel.

7. The thread repair tool of claim 1, wherein said abrasive surface consists of cubic boron nitride and the metal filler, and the metal filler consists of nickel.

8. The thread repair tool of claim 1, wherein said shaft is fixedly connected to and integrally connected to said disc-shaped member.

9. The thread repair tool of claim 1, wherein said shaft is separable from and fixedly connectable to said disc-shaped member.

10. A kit comprising:
    two or more thread repair tools, wherein each of the two or more thread repair tools consists of the thread repair tool of claim 1.

11. The kit of claim 10, further comprising:
a hand-held powered device capable of rotating said disc-shaped member and said shaft along said axis of rotation $A_R$, said hand-held powered device being selected from a drill, an air grinder, an electric grinder, and any combination thereof; and
one or more of:
  a carrying case sized to house (i) the one or more thread repair tools, and (ii) the hand-held powered device;
  a plurality of thread repair tools with two or more tools of the plurality comprising the thread repair tool;
  cutting lubricant;
  cleaning fluid;
  a brush for cleaning threads; and
  one or more accessory wrenches for removing the thread repair tool from a drill or grinder.

12. A method of using the thread repair tool of claim 1, said method comprising:
abrading an object with the disc-shaped member of the thread repair tool.

13. The thread repair tool of claim 1, wherein said shaft has (i) a first cross-sectional area $S_A$ from said second major surface of said disc-shaped member to a location along said shaft length $S_L$, the location being closer to said second shaft end than said second major surface of said disc-shaped member, and (ii) a second cross-sectional area $S_A$ from said location to said second shaft end, and said first cross-sectional area $S_A$ is greater than said second cross-sectional area $S_A$.

14. A method of using a thread repair tool in combination with a hand-held powered device to abrade an object, said method comprising:
connecting the thread repair tool to a hand-held powered device capable of rotating the thread repair tool along an axis of rotation $A_R$ of the thread repair tool, the thread repair tool consisting of:
  a disc-shaped member having a first major surface, a second major surface opposite the first major surface, an outer periphery separating the first major surface from the second major surface, and the axis of rotation $A_R$ extending through and dissecting each of the first and second major surfaces, the disc-shaped member having a disc diameter $d_D$ of from about 0.375 in to about 3.0 in;
  a shaft fixedly connected to or fixedly connectable to the disc-shaped member, the shaft extending from the second major surface of the disc-shaped member along the axis of rotation $A_R$, the shaft having (a) a cross-sectional area $S_A$ along a shaft length $S_L$ between (i) the second major surface of the disc-shaped member, proximate a first shaft end of the shaft, and (ii) a second shaft end positioned away from the disc-shaped member, (b) a shaft length $S_L$ of from about 1.0 in to about 6.0 in, and (c) a shaft diameter $S_W$ of from about 0.2 in to about 0.6 in;
  an optional connecting member that connects the disc-shaped member to the shaft; and
  an abrasive surface along the outer periphery, the abrasive surface (i) consisting of diamond, cubic boron nitride or tungsten carbide steel, and optionally a metal filler for adhesion, and (ii) being capable of abrading an object; and
abrading the object with the disc-shaped member of the thread repair tool as the thread repair tool is rotated along said axis of rotation $A_R$ by the hand-held powered device,
wherein said method allows for in field maintenance and repair.

15. The method of claim 14, further comprising:
connecting the disc-shaped member of the thread repair tool to the shaft of the thread repair tool.

16. The method of claim 14, further comprising:
replacing the disc-shaped member of the shaft with a replacement disc-shaped member.

17. The method of claim 14, further comprising:
holding the hand-held powered device and making circular sweeps around a perimeter of an area of the object being abraded.

18. The method of claim 14, wherein the hand-held powered device is selected from a drill, an air/electric grinder, and any combination thereof.

19. The method of claim 14, wherein the hand-held powered device is a drill.

20. A thread repair tool sized and shaped for use with a hand-held powered device, said thread repair tool comprising:
  a disc-shaped member having a first major surface, a second major surface opposite said first major surface, an outer periphery separating said first major surface from said second major surface, and an axis of rotation $A_R$ extending through and dissecting each of said first and second major surfaces, said disc-shaped member having a disc diameter $d_D$ of from about 0.375 inches (in) to about 3.0 in;
  a shaft fixedly connected to or fixedly connectable to said disc-shaped member, said shaft (a) extending from said second major surface of said disc-shaped member along said axis of rotation $A_R$, (b) having a shaft length $S_L$ between a first shaft end proximate said disc-shaped member and a second shaft end positioned away from said disc-shaped member, (c) having a shaft length $S_L$ of from about 1.0 in to about 6.0 in, (d) having a shaft diameter $S_W$ of from about 0.2 in to about 0.6 in, and (e) having (i) a first cross-sectional area $_A$ from said second major surface of said disc-shaped member to a location along said shaft length $S_L$, the location being closer to said second shaft end than said second major surface of said disc-shaped member, and (ii) a second cross-sectional area $S_A$ from said location to said second shaft end, and said first cross-sectional area $S_A$ is greater than said second cross-sectional area $S_A$; and
  an abrasive surface along said outer periphery, said abrasive surface (i) being capable of abrading a metal object, and (ii) comprising diamond, cubic boron nitride, carbide steel, or 4140 steel.

21. The thread repair tool of claim 20, wherein said shaft is fixedly connected to and integrally connected to said disc-shaped member.

22. A kit comprising:
two or more thread repair tools, wherein each of the two or more thread repair tools comprises the thread repair tool of claim 20.

23. The kit of claim 22, further comprising:
a hand-held powered device capable of rotating said disc-shaped member and said shaft along said axis of rotation $A_R$, said hand-held powered device being selected from a drill, an air grinder, an electric grinder, and any combination thereof; and
one or more of:
  a carrying case sized to house (i) the one or more thread repair tools, and (ii) the hand-held powered device;
  a plurality of thread repair tools with two or more tools of the plurality comprising the thread repair tool;

cutting lubricant;
cleaning fluid;
a brush for cleaning threads; and
one or more accessory wrenches for removing the thread repair tool from a drill or grinder.

24. A method of using the thread repair tool of claim 20, said method comprising:
connecting the thread repair tool to a hand-held powered device capable of rotating the thread repair tool along an axis of rotation $A_R$ of the thread repair tool; and
abrading the metal object with the disc-shaped member of the thread repair tool as the thread repair tool is rotated along the axis of rotation $A_R$ by the hand-held powered device.

\* \* \* \* \*